United States Patent
Anzai et al.

(10) Patent No.: US 7,294,003 B2
(45) Date of Patent: Nov. 13, 2007

(54) MEMORY CARD SOCKET STRUCTURE

(75) Inventors: Tsunehiro Anzai, Watarai (JP); Hirohisa Tanaka, Tsu (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 11/524,193

(22) Filed: Sep. 21, 2006

(65) Prior Publication Data

US 2007/0072464 A1    Mar. 29, 2007

(30) Foreign Application Priority Data

Sep. 27, 2005    (JP) .............................. 2005-279803

(51) Int. Cl.
*H01R 13/62* (2006.01)
(52) U.S. Cl. ...................... 439/159; 439/333
(58) Field of Classification Search ................ 439/159, 439/31, 333, 345
See application file for complete search history.

(56) References Cited

U.S. PATENT DOCUMENTS

| | | | |
|---|---|---|---|
| 6,648,660 B2 * | 11/2003 | Sato et al. ................... | 439/159 |
| 6,994,573 B2 * | 2/2006 | Tanaka et al. ............... | 439/159 |
| 2002/0155739 A1* | 10/2002 | Sato et al. ................... | 439/159 |
| 2003/0017732 A1 | 1/2003 | Hsu | |
| 2003/0054694 A1 | 3/2003 | Takamori et al. | |
| 2003/0119350 A1* | 6/2003 | Chen ........................... | 439/159 |
| 2003/0224640 A1* | 12/2003 | Sato et al. ................... | 439/159 |
| 2004/0092146 A1* | 5/2004 | Tien ............................ | 439/159 |
| 2005/0009389 A1 | 1/2005 | Chang | |
| 2005/0014405 A1 | 1/2005 | Chen | |

\* cited by examiner

*Primary Examiner*—James R. Harvey
(74) *Attorney, Agent, or Firm*—Bacon & Thomas, PLLC

(57) ABSTRACT

A memory card socket structure includes a card compartment for allowing a memory card to be inserted thereinto or taken out therefrom, a contact block disposed at a rear side of the card compartment, a slider moved back and forth between a position near the opening side and a position near the rear side in the card compartment along with an insertion and extraction of the memory card, a coil spring for pressing the slider toward the opening side of the card compartment, and a spring guide fixed at the contact block and elongated toward the opening side of the card compartment to be inserted through the coil spring. The spring guide includes a base end portion provided with a connection portion to be adjoined to the circuit board.

5 Claims, 7 Drawing Sheets

MEMORY CARD SOCKET STRUCTURE

FIELD OF THE INVENTION

The present invention relates to a memory card socket structure.

BACKGROUND OF THE INVENTION

Recently, various electronic devices such as a digital camera and a mobile phone have been increasingly equipped with a memory card socket structure for allowing a small-sized storage medium (hereinafter, simply referred to as 'memory card') such as a Mini SD Memory Card (®) to be inserted thereinto or taken out therefrom.

Such a memory card socket structure typically has a plurality of contact terminals (contacts) making a contact with terminals (I/O contact surfaces) of a memory card corresponding thereto when the memory card is inserted in a card accommodating portion of a memory card case installed at an electronic device, wherein transception of data and signals is carried out between the memory card and the electronic device via the contact terminals.

The memory card socket structure has a slider installed in the card compartment, the slider capable of moving back and forth in response to the insertion and extraction of the memory card; and a coil spring for urging the slider toward an opening side of the card compartment. By pressing the memory card through the slider, the memory card can be taken out from the socket structure.

Here, a bar-shaped spring guide is inserted through the winding of the coil spring, and the spring guide serves to facilitate positioning of the coil spring while preventing buckling (see, for example, Japanese Patent Laid-open Application No. 2004-119182, p. 4, FIG. 4).

In the above configuration, however, when assembling the spring guide while keeping it as a separate component from a case of the socket structure, a leading end portion of the spring guide is inserted through the coil spring. At the same time, a collar portion formed at a base end portion of the spring guide is fixedly engaged with a cutoff portion provided at a plate of the case.

That is, the fixation of the spring guide is implemented by just engaging its collar portion with the cutoff portion of the plate of the case. Therefore, it is difficult to significantly increase support strength of the spring guide. Further, since the spring guide is assembled as a separate component, the number of assembling steps increases, resulting in deterioration of productivity.

SUMMARY OF THE INVENTION

It is, therefore, an object of the present invention to provide a memory card socket structure capable of improving rigidity and strength of the support for a spring guide, while reducing the number of assembling steps involved.

In accordance with a preferred embodiment of the present invention, there is provided a memory card socket structure including: a shell member having a card compartment for allowing a memory card to be inserted thereinto or taken out therefrom; a contact block disposed at a rear side of the card compartment; a plurality of contact terminals fixed at the contact block, each leading end of the contact terminals being projected toward an opening side of the card compartment to be in contact with terminals of the memory card and each base end thereof being connected to a circuit board; a slider moved back and forth between a position near the opening side and a position near the rear side in the card compartment along with an insertion and extraction of the memory card; a coil spring for pressing the slider toward the opening side of the card compartment; and a spring guide fixed at the contact block and elongated toward the opening side of the card compartment to be inserted through the coil spring, wherein the spring guide includes a base end portion provided with a connection portion to be adjoined to the circuit board.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
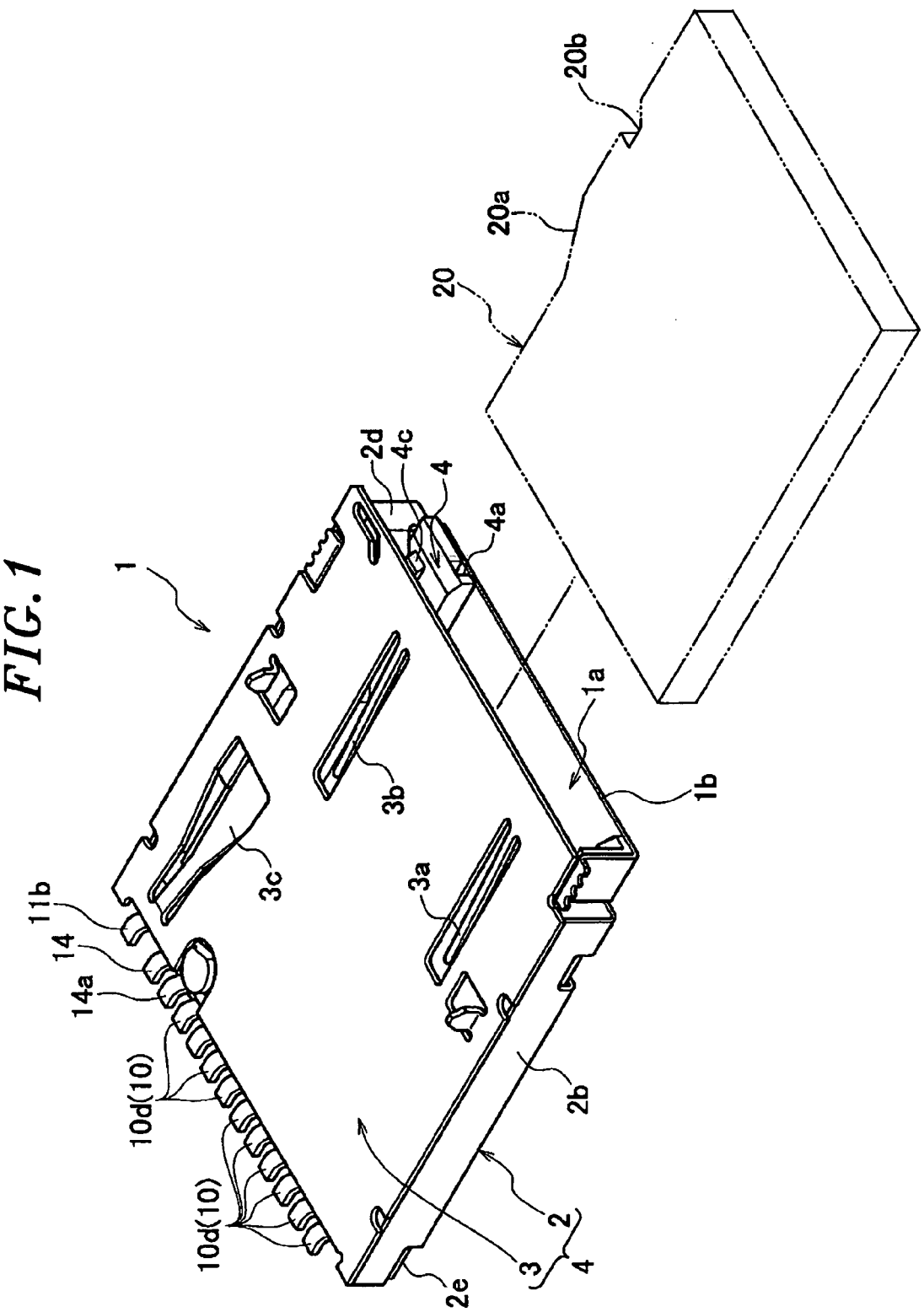
FIG. 1 is a perspective view of a memory card socket structure in accordance with a preferred embodiment of the present invention prior to a memory card being inserted therein.
Figure 2:
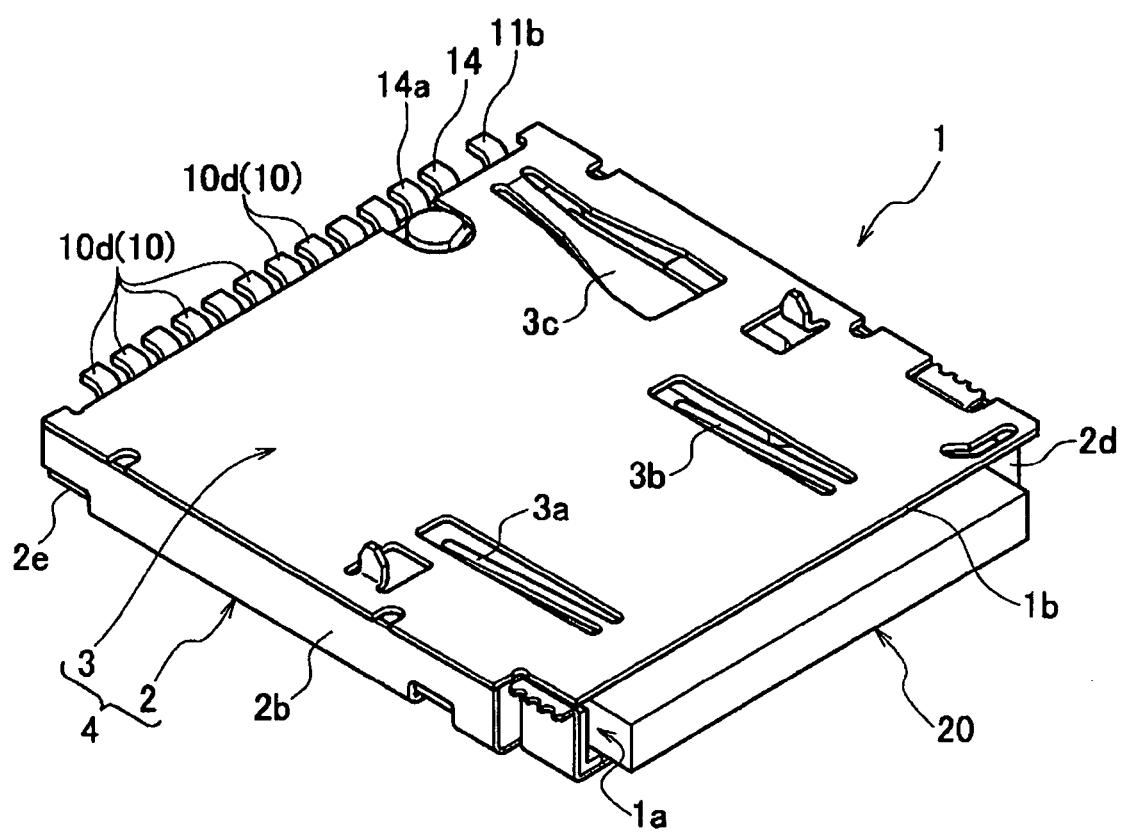
FIG. 2 sets forth a perspective view showing a state where the memory card is inserted in the memory card socket structure.

Hereinafter, preferred embodiments of the present invention will be described in detail with reference to the accompanying drawings.

A memory card socket structure 1 in accordance with a first preferred embodiment of the present invention is disposed at an electronic device (not shown) or the like to serve as a socket for allowing a memory card 20 to be inserted thereinto or taken out therefrom. When the memory card 20 is inserted into the memory card socket structure 1, terminals (electrodes, not shown) formed and exposed at a top or a bottom surface of the memory card 20 is brought into contact with contact terminals 10 provided in the memory card socket structure 1 to be electrically connected therewith, thus making it possible to transceive data between the electronic device or the like and the memory card 20.

Further, the memory card socket structure 1 is configured to have a so-called push-on and push-off mechanism, in which the memory card 20 can be locked in a preset mounting state by being inserted and pushed into a card compartment (card accommodating portion) 1a of the memory card socket structure 1 through an opening (entrance) 1b thereof, and can be unlocked from the locked state and rejected from the opening 1b of the card compartment 1a by being pushed thereafter.

In general, the memory card socket structure 1 includes a case in a rectangular shelled shape with a substantially plan surfaces and the thin elongated strip-shaped opening 1b at its one side (front side); a slider 5 supported in the card compartment 1a of the case so as to be moved back and forth between the opening 1b side and the rear side of the card compartment 1a; a coil spring 8 serving as a biasing member for forcing the slider 5 toward the opening 1b side in the card compartment 1a; a contact block 7 disposed at the rear portion of the card compartment 1a; and a plurality of stationary contact terminals 10 fixed at the contact block 7.

Specifically, in the memory card socket structure 1, the card compartment 1a, which is adapted to allow the memory card 20 to be inserted thereinto or taken out therefrom, is formed by a shell member 4 having a base shell 2 and a cover shell 3 made of a metal plate such as stainless steel having an electric conductivity and disposed to face a top and a bottom surface of the memory card 20. In this preferred embodiment, by forming the base shell 2 and the cover shell 3 with the metal material, the case can be made to have desired rigidity and strength. At the same time, they can be used as grounds (earths) by forming the two components with the conductive material.

The base shell 2 includes a substantially rectangular base 2a and two sidewalls 2b, 2c having a certain height formed by bending a pair of widthwise ends of the base 2a approximately in perpendicular manners. That is, the base shell 2 is in a U shape with a cross section of evenly leveled walls for overall.

Further, a stopper 2d is formed at an opening 1b side of one (e.g., 2c in FIG. 3) of the sidewalls 2b and 2C by raising a corner portion of the base 2a. With the stopper 2d, the slider 5 is prevented from being released out of the opening 1b. Further, the base 2a has hook portions 2e on which the contact block 7 is hooked to be fastened at its installation position; and projection bars 2f elongated in a reciprocating direction of the memory card 20.

Figure 3:
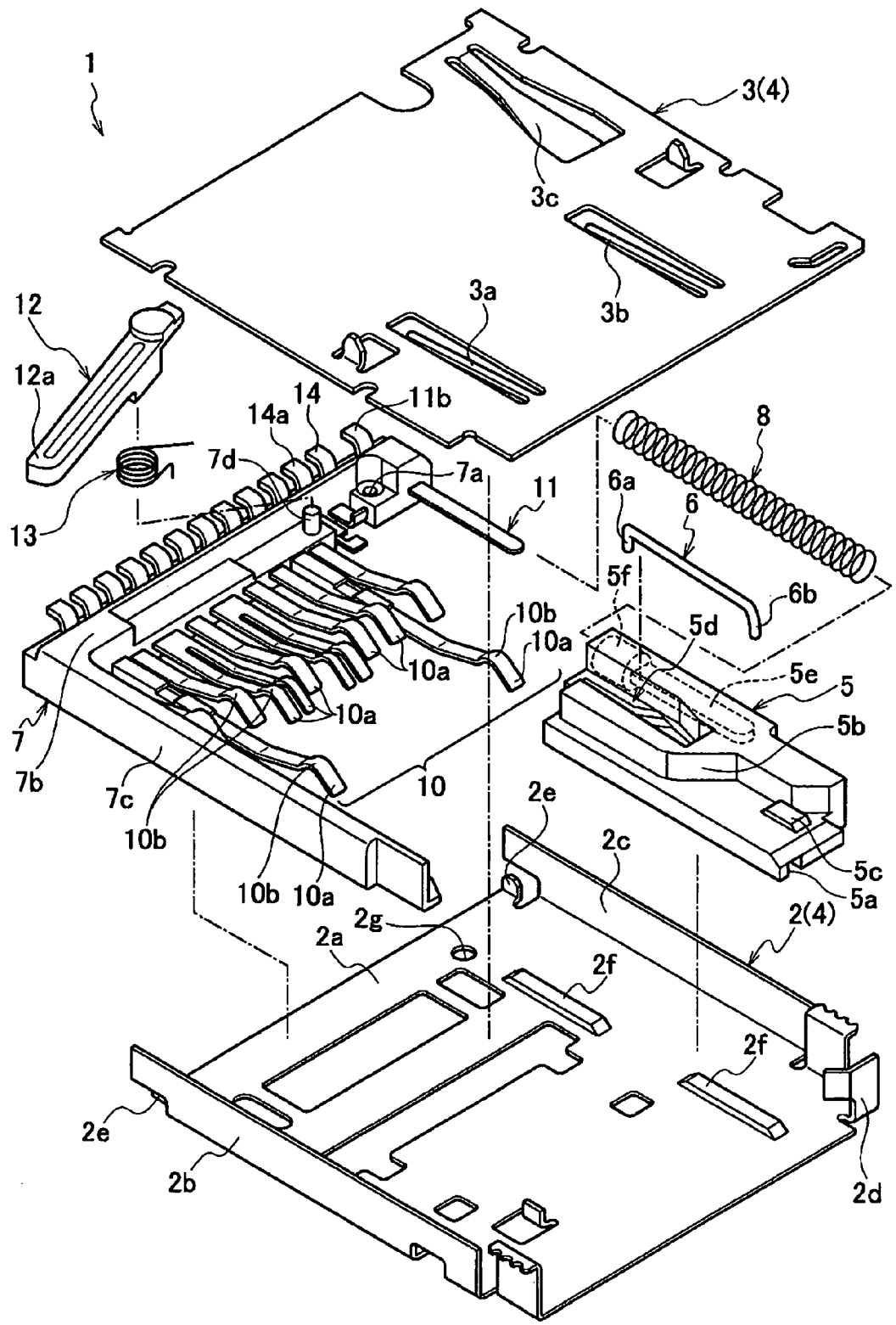
FIG. 3 presents an exploded perspective view of the memory card socket structure.

Referring to FIG. 3, the cover shell 3 is obtained by a metal plate made of stainless steel or the like into by forming it into an approximately rectangular plate shape identical to the shape of the base 2a of the base shell 2. Provided on the cover shell 3 is spring members 3a and 3b for pressing the memory card 20, and a spring element 3c for pressing a pin 6 to be described later is also provided.

The base shell 2 and the cover shell 3 are welded by, e.g., laser welding such that the cover shell 3 is mounted on the raised ends of the sidewalls 2b and 2c, thereby defining the card compartment 1a.

Further, by engaging projection bars 2f provided on the base shell 2 with recesses 5a formed at the slider 5, the slider 5 is guided to move back and forth along the sidewall 2c of the base shell 2. The slider 5 has an engaging portion 5b to be fitted with a corresponding stepped portion 20a (see FIG. 4) and a protrusion 5c to be engaged with a cutoff portion 20b (see FIG. 4). The stepped portion 20a and the cutoff portion 20b are provided on a peripheral surface of one side of the memory card 20 such that the cutoff portion 20b is located apart from the stepped portion 20a in a direction opposite to the memory card inserting direction.

If the memory card 20 is inserted into the card department 1a through the opening 1b, the stepped portion 20a of the memory card 20 will come into contact with the engaging recess 5b, and the cutoff portion 20b is engaged with the protrusion 5c. Therefore, the memory card 20 is allowed to be moved back and forth in the card compartment 1a while being maintained on the slider 5.

Positioning of the slider 5 in the card compartment 1a is controlled by the pin 6, whose first end 6a is rotatably fitted into an insertion hole 7a of the contact block 7; a groove portion 5d for guiding a second end 6b of the pin 6 along a preset path; and the coil spring 8, interposed between the slider 5 and the contact block 7, for biasing the slider 5 toward the opening 1b.

In particular, with predetermined steps on the bottom surface of the groove portion 5d, the second end 6b of the pin 6 is guided into a desired passage of the groove portion 5d without being retrograded at least within a specific range. In other words, the second end 6d is guided into the desired passage in the groove portion 5d by forcing, with a biasing force of the coil spring 8 and a force exerted from inserting the memory card 20, the second end 6d to be in contact with side walls of the groove portion 5d and with the bottom surface of the groove portion 5d by mean of the spring element 3c provided at the cover shell 3.

Further, a part of the groove portion 5d closed to the opening 1b side is in a substantially heart shape when viewed from the top, forming a so-called heart cam mechanism. The above-mentioned push-on and push-off functions of the memory card 20 is, therefore, realized.

The contact block 7 has an inner wall 7b and a sidewall 7c made of an insulating resin, wherein the inner wall 7b and the sidewall 7c jointly form an L shape when viewed from the top. The contact block 7 is fixed on the base shell 2 via the hook portions 2e such that its inner wall 7b is disposed at the rear side of the card compartment 1a, while its sidewall 7c is disposed at the sidewall 2b (see FIG. 3) of the card compartment 1a.

The inner wall 7b has a plurality of bar-shaped contact terminals 10 penetrating it, wherein the contact terminals 10 are formed of a conductive metal, and leading ends 10a of the contact terminals 10 are projected through inside the card compartment 1a from the inner wall 7b, facing toward the opening 1b.

The memory card 20 is inserted between the contact terminals 10 and the cover shell 3. Each leading end 10a of the contact terminals 10 is provided with a curved portion 10b smoothly protruded toward the cover shell 3. When the memory card 20 is inserted in a preset mounted position near the rear side of the card compartment 1a, the curved portions 10b come into contact with terminals (memory card terminals) provided on a surface of the memory card, the surface facing the base shell 2 (i.e., the bottom surface of the memory card 20 in the drawings).

Figure 6:
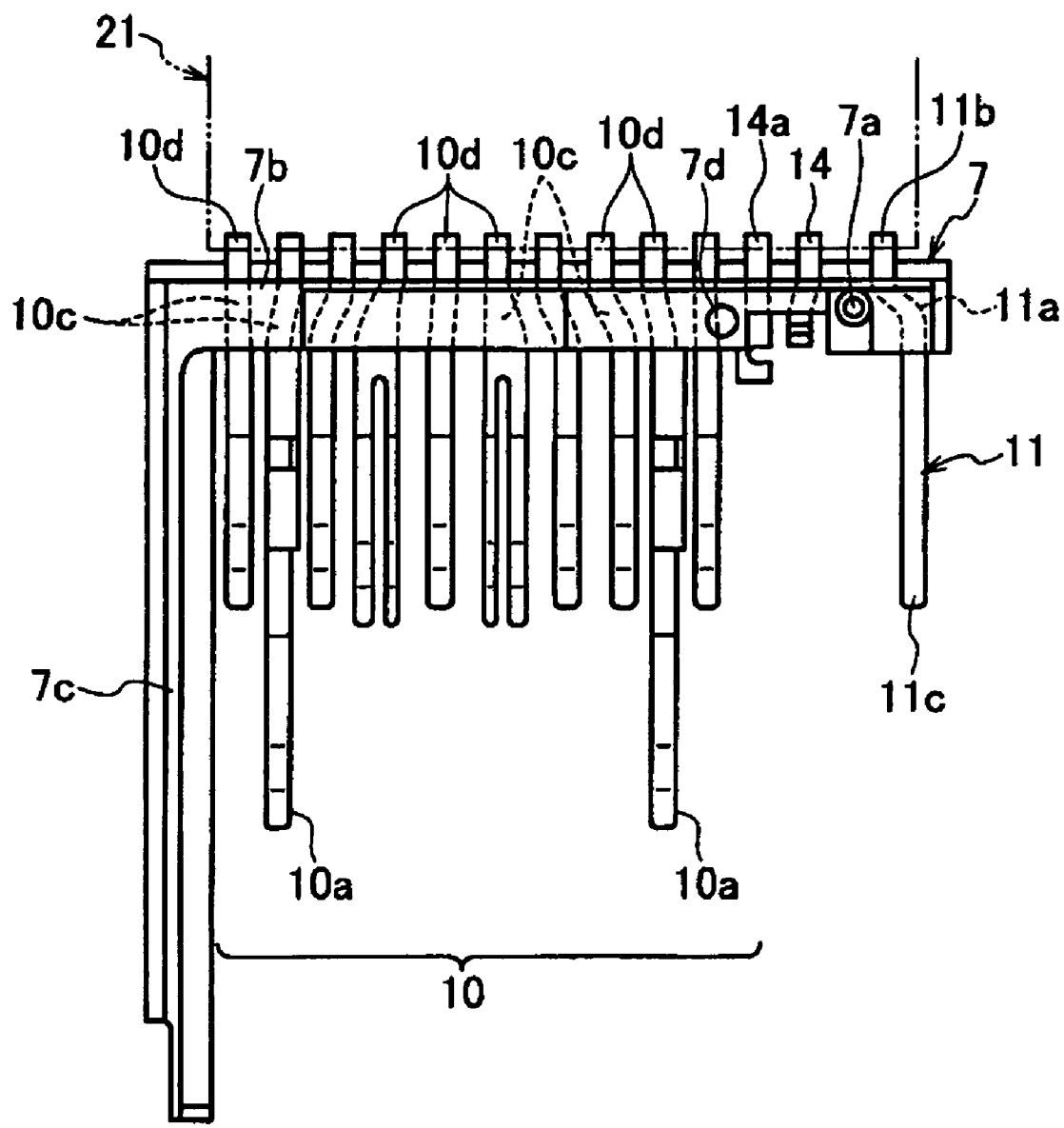
FIG. 6 offers a top view of a contact block having a plurality of contact terminals and a spring guide fixed thereat in accordance with the preferred embodiment of the present invention.
Figure 7:
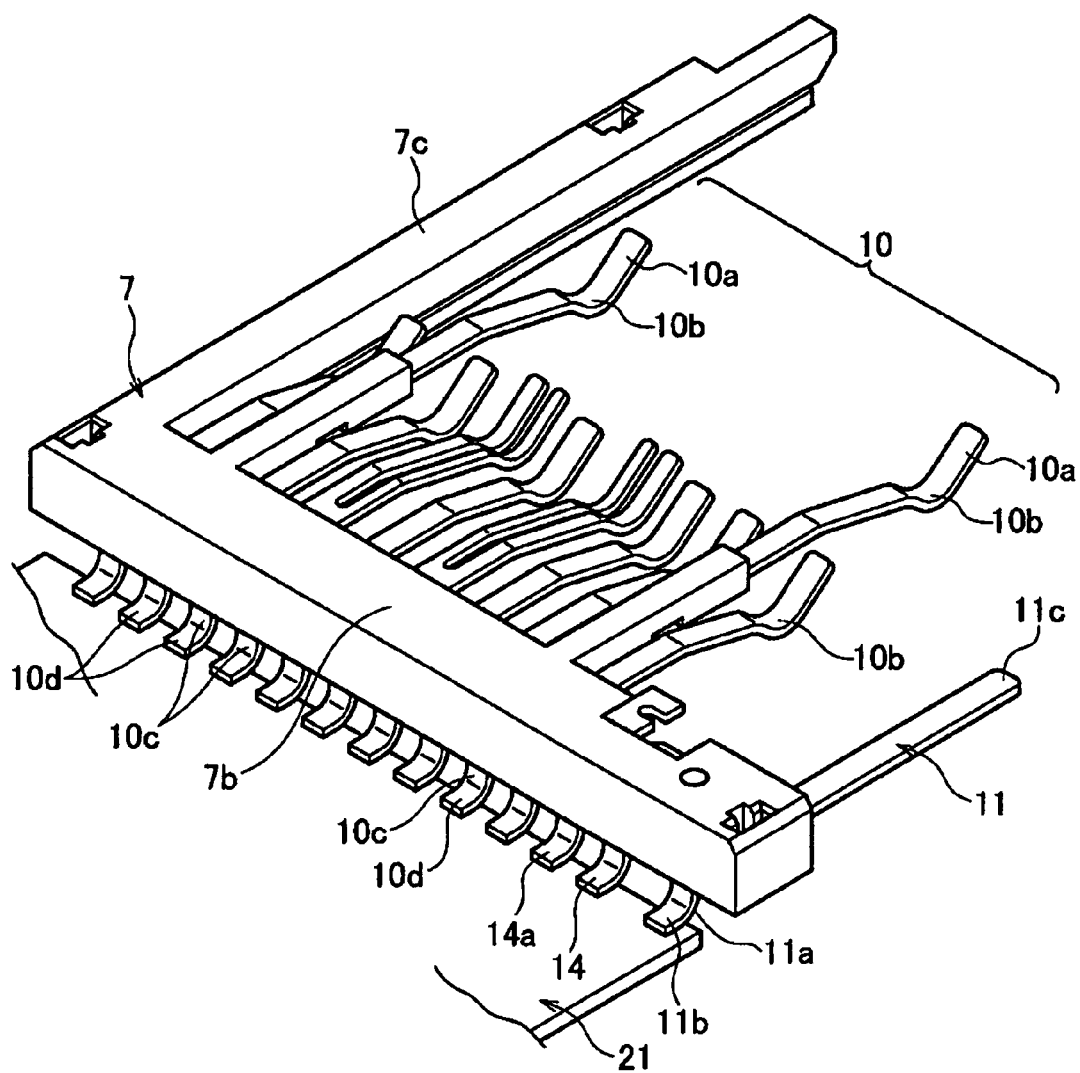
FIG. 7 shows a perspective bottom view of the contact block shown in FIG. 6.

Referring to FIGS. 6 and 7, the contact terminals 10 are integrated as a whole with the contact block 7 by embedding each base end portion 10c thereof into the contact block 7 by means of insert molding. Further, each leading end 10d of the base end portions 10c is projected from the contact block 7 toward the opposite side of the card compartment 1a (i.e., opposite of the opening 1b side of the card compartment 1a). Each of the leading end 10d of the base end portions 10c is connected to a circuit board 21 (specifically, a conductor pattern or an electrode thereof) by soldering.

Further, as illustrated in FIG. 3, a movable arm 12 is rotatably supported at a columnar protrusion 7d protruded from the inner wall 7b of the contact block 7. Specifically, a leading end portion 12a of the movable arm 12 is pivotally biased toward the opening 1b side by a torsion spring 13 wounded around the protrusion 5c, while it is pivotally pressed toward the rear side of the card compartment 1a through a leading end portion of the memory card 20 which is inserted into the card compartment 1a.

Figure 4:
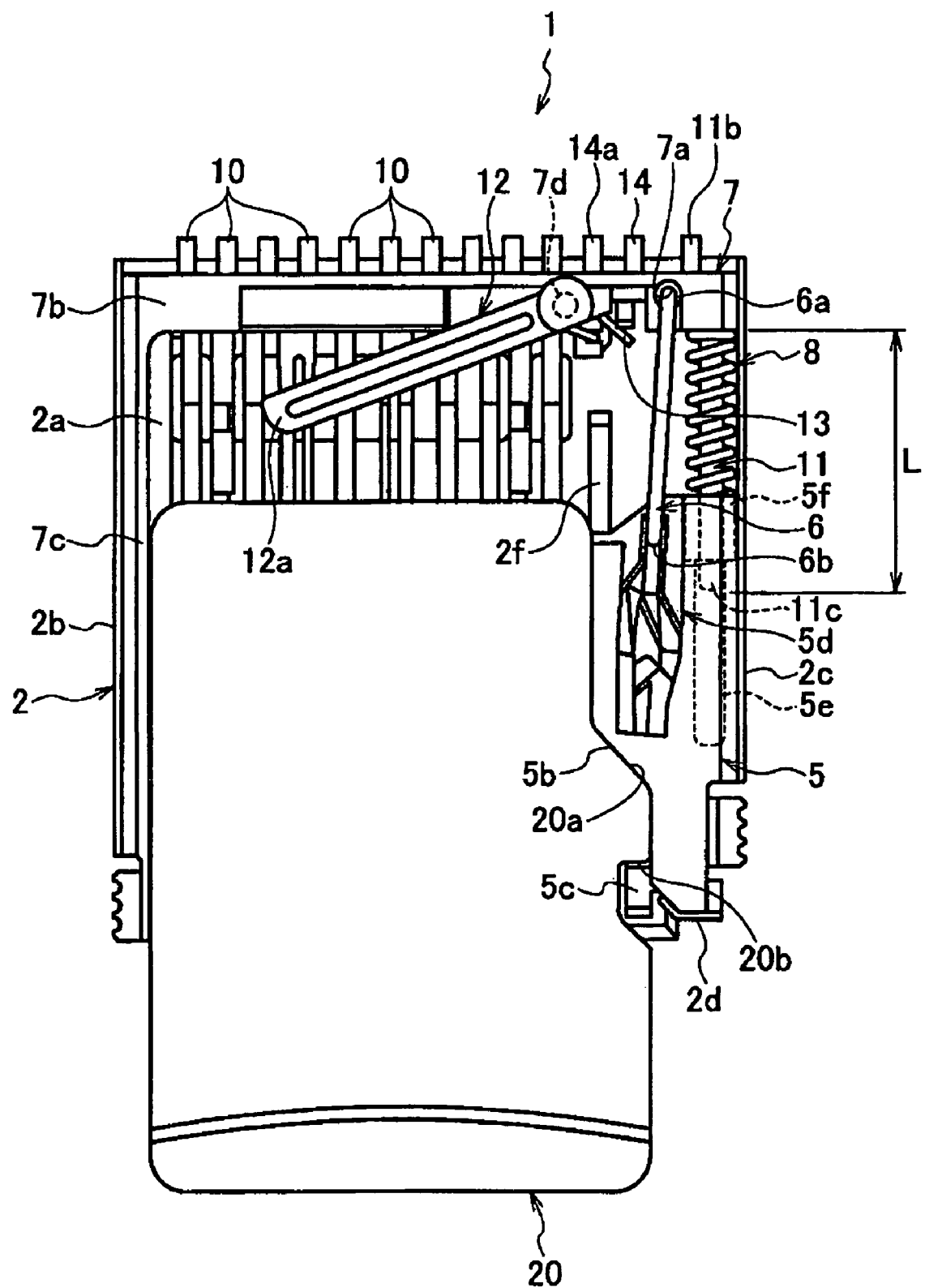
FIG. 4 provides a top view of the memory card socket structure, from which a cover is detached, showing a state prior to the memory card being mounted in the socket structure.

Accordingly, when the memory card 20 is yet to be inserted all the way to its mounted position near the rear side of the card compartment 1a and is in a non-contact position with the movable arm 12, the leading end portion 12a of the movable arm 12 is fully rotated toward the opening 1b (below, simply referred to as "maximum opening 1b-side position), as shown in FIG. 4. Further, as shown in FIG. 5, when the memory card 20 is inserted all the way to its mounted position, the leading end portion 12a of the movable arm 12 is rotated toward the rear side, thereby being located at a rear position of the card compartment 1a.

Figure 5:
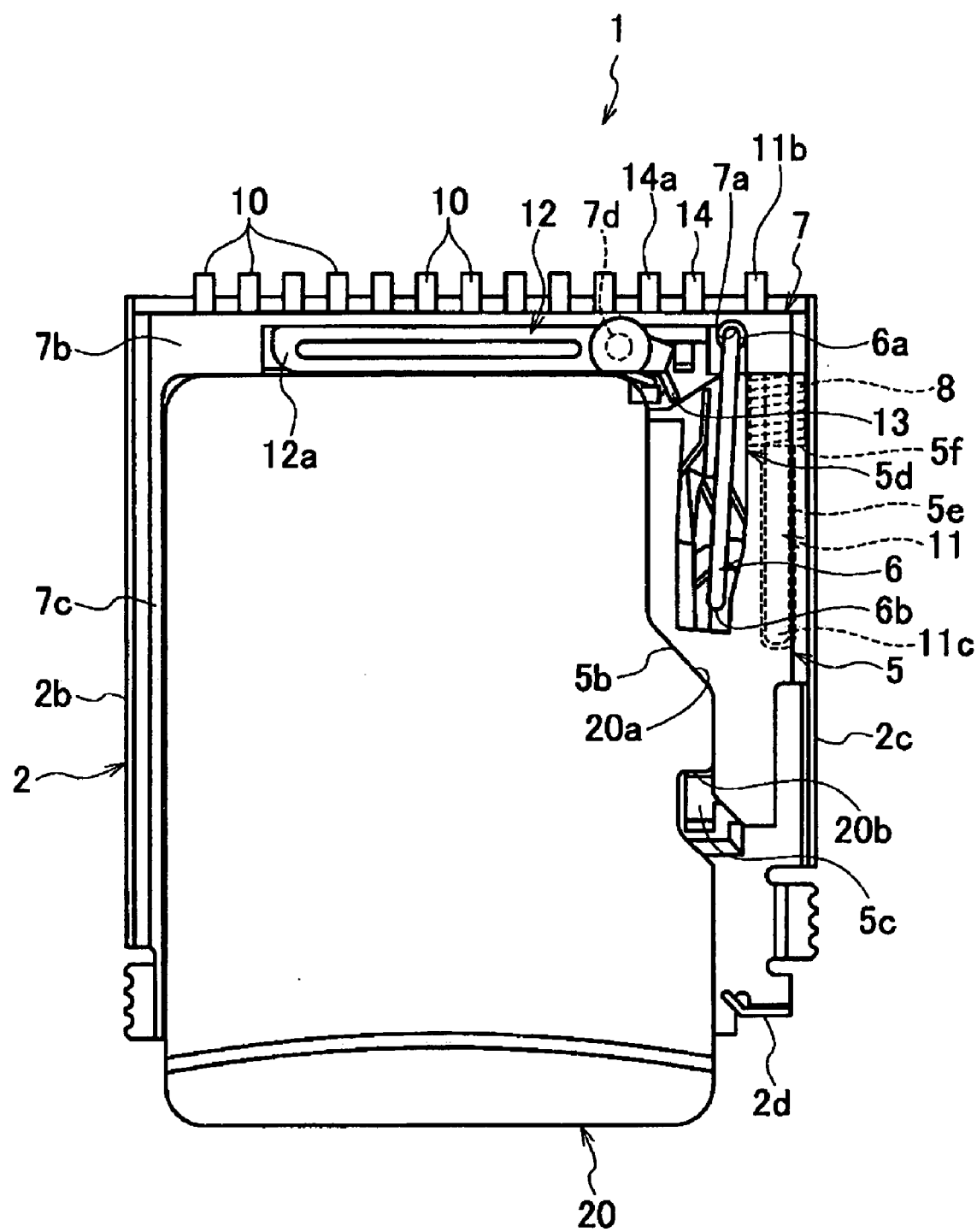
FIG. 5 depicts a top view of the memory card socket structure, from which the cover is detached, showing a state where the memory card is mounted in the socket structure.

That is, depending on the insertion and the extraction of the memory card 20, the movable arm 12 is rotated between the maximum opening 1b-side position shown in FIG. 4 and the rear position shown in FIG. 5. When the movable arm 12 is located at the maximum opening 1b-side position, two stationary contacts 14 and 14a fixed at the contact block 7 are made to be short-circuited electrically, while being electrically separated from each other when the movable arm 12 is disposed at its rear position.

Accordingly, by detecting a conducting or a non-conducting state between the stationary contacts 14 and 14a, it is possible to sense whether or not the memory card 20 is present at the preset mounted position in the card compartment 1a.

In this preferred embodiment, a bar-shaped spring guide 11 is installed at the inner wall 7b of the contact block 7 such that it is elongated toward the opening 1b side of the card compartment 1a, as shown in FIGS. 6 and 7, and the spring guide 11 is inserted through within the coil of the coil spring 8, thereby preventing buckling of the coil spring 8.

A base end portion 11a of the spring guide 11 is embedded within the contact block 7 as a single body. The spring guide 11 is elongated toward the opening 1b side of the card compartment 1a, while a leading end 11b of its base end portion 11a is projected from the contact block 7 toward the opposite side of the card compartment 1a (i.e., opposite of the opening 1b side of the card compartment 1a). The leading end 11b of the base end portion 11a is soldered to the circuit board 21 (i.e., to its conductor pattern or its electrode). That is, in this preferred embodiment, the leading end 11b serves as a connection portion to be adjoined to the circuit board.

Further, as shown in FIGS. 3 to 5, the slider 5 is provided with an elongated hole 5e used as a recess portion into which the spring guide 11 is inserted. A leading end portion 11c of the spring guide 11 is kept inserted in the elongated hole 5e even at a state where the slider 5 is located at its opening 1b-side position as shown in FIG. 4, i.e., at a state where the memory card 20 is yet to be inserted. This configuration can be realized by appropriately setting the length L of the spring guide 11, the shape of the slider 5, and so forth.

Moreover, the slider 5 has a spring receiving recess 5f for receiving the coil spring 8, and the spring receiving recess 5f is set to have a depth capable of accommodating the coil spring 8 at a fully contracted state, as shown in FIG. 5, without causing buckling of the coil spring 8. In this preferred embodiment, since the slider 5 is in contact with the inner wall 7b when the coil spring 8 is fully contracted, the contracted coil spring 8 can be accommodated completely within the spring receiving recess 5f. In such a configuration, the elongated hole 5e for the spring guide 11 is elongated from the bottom surface of the spring receiving recess 5f toward the opening 1b.

In accordance with the preferred embodiment as described above, when the memory card 20 is inserted through the opening 1b of the card compartment 1a as shown in FIG. 4 and pushed to its mounted position as shown in FIG. 5, the slider 5 is made to move toward the rear side of the card compartment 1a while compressing the coil spring 8.

Here, since the spring guide 11 is inserted through the winding of the coil spring 8, the coil spring 8 is guided by the spring guide 11 when it is being contracted, thereby preventing buckling of the coil spring 8. Further, the spring receiving recess 5f formed at the slider 5 can also be served as a guide for the coil spring 8.

In addition, since the spring guide 11 is integrated as a whole with the contact block 7 at which the contact terminals 10 if fixed by embedding the base end portion 11a thereof within the contact block 7, the spring guide 11 can be installed in the socket structure 1 by assembling the contact block 7 to the socket structure 1. That is, since the spring guide 11 is not provided as a separate component but as a whole by being insert-molded, the assembling process therefor is simple and rapid. Consequently, the number of components involved and assembling steps can be reduced in comparison with conventional cases, resulting in improvement of productivity.

Further, since the spring guide 11 is formed as a whole with the contact block 7, the rigidity and strength of the support for the spring guide 11 can be increased as compared to the prior art, and since the leading end 11b of the base end portion 11a of the spring guide 11 can be soldered to the circuit board 21, the rigidity and strength for the support thereof can also be further enhanced.

Here, as shown in FIG. 7, the leading end 11b of the base end portion 11a of the spring guide 11 is positioned on a substantially same line with the leading ends 10d of the base end portions 10c of the contact terminals 10, and it is configured to be substantially in a same shape as those of the leading ends 10d. Thus, the task of connecting the leading ends 10d of the contact terminals 10 to the circuit board 21 and the work of coupling the leading end 11b of the spring guide 11 to the circuit board 21 can be performed in one same process at once under like manners, so that the work efficiency can be improved.

Further, in accordance with the preferred embodiment of the present invention, since the leading end portion 11c of the spring guide 11 is configured to be inserted in the elongated hole 5e formed at the slider 5 when the slider 5 is located in the opening 1b-side position in the card compartment 1a, the extension and contraction of the coil spring 8 can be guided by at least one of the spring guide 11 and the elongated hole 5e. Thus, buckling of the coil spring 8 can be suppressed more securely, and the movement of the slider 5 can also be made smoother.

While the invention has been shown and described with respect to the preferred embodiments, it will be understood by those skilled in the art that various changes and modifications may be made without departing from the spirit and scope of the invention as defined in the following claims.

What is claimed is:

1. A memory card socket structure comprising:
   a shell member having a card compartment for allowing a memory card to be inserted thereinto or taken out therefrom;
   a contact block disposed at a rear side of the card compartment;
   a plurality of contact terminals fixed at the contact block, each end portion of the contact terminals being projected toward an opening side of the card compartment to be in contact with terminals of the memory card and each base portion of the contact terminals being connected to a circuit board;

a slider moved back and forth between a position near the opening side and a position near the rear side in the card compartment along with an insertion and extraction of the memory card;

a coil spring for pressing the slider toward the opening side of the card compartment; and a spring guide fixed at the contact block and elongated toward the opening side of the card compartment to be inserted through the coil spring, wherein the spring guide includes a base portion provided with a leading end to be adjoined to the circuit board, and wherein the base portion of the spring guide is embedded within the contact block as a single body.

2. The socket structure of claim 1, wherein the slider is provided with a recess portion which allows for the insertion of the spring guide thereinto, and an end portion of the spring guide proximal to the opening side of the card compartment is kept inserted into the recess portion at a state where the slider is located in the position near the opening side.

3. The socket structure of claim 1, wherein the leading end of the base portion of the spring guide is positioned on a substantially same line with a leading end of each base portion of the contact terminals, and wherein the leading end of the base portion of the spring guide is configured to be substantially in a same shape as the leading end of each base portion of the contact terminals.

4. The socket structure of claim 2, wherein the leading end of the base portion of the spring guide is positioned on a substantially same line with a leading end of each base portion of the contact terminals, and wherein the leading end of the base portion of the spring guide is configured to be substantially in a same shape as the leading end of each base portion of the contact terminals.

5. The socket structure of claim 1, wherein the spring guide and the contact block are formed as a single body by insert-molding.

* * * * *